3,077,394
CONTROL OF AQUATIC VEGETATION
Melvin J. Josephs, Midland, Mich., assignor to The Dow Chemical Company, Midland, Mich., a corporation of Delaware
No Drawing. Filed Nov. 5, 1958, Ser. No. 771,974
3 Claims. (Cl. 71—2.6)

This invention relates to herbicides and is particularly concerned with compositions and methods for control of aquatic plants. The expression "aquatic plants" as herein employed refers to vegetative organisms normally growing in water in which the leaves and stem parts are normally largely submerged. The expression is inclusive of water plants such as Ceratophyllum spp., Salvinia spp. which are normally free floating in their environing water as well as immersed species which are typically rooted in earth, such as Vallisneria spp. ("tape-grass"), Potamogeton spp. ("pond weed"), and Lysimastrum spp., and species which appear to grow normally in all respects either free-floating or rooted, such as Cabomba spp., and Anacharis spp.

Aquatic plants growing out of place are commonly called weeds, and millions of dollars are expended annually for their control.

In irrigation ditches, canals, lakes, rivers and streams of pleasure and commerce, unwanted growth of aquatic plants hinders the flow of water and cause excessive sedimentation. Further, such growth causes high water loss from evaporation, and interferes with navigation. Further, such growth passing from maturity to death and decay, introduces into the water in which it appears biological processes which impoverish the water of dissolved oxygen, thereby killing or driving away many kinds of desirable fish and other aquatic life. Mechanical operations such as dredging, chaining, burning, and mowing are still the principal means by which control of such weeds is attempted. More recently, efforts have been made at chemical control. The shortcomings of chemical methods have included superficial burning of foliage without killing of the plants, with the result that regrowth of the denuded plants takes place rapidly. Further, many of the proposed materials are as toxic to terrestrial plants as they are to aquatic plants so that the treated water is unsuited for irrigation of terrestrial crop plants or injurious to littoral vegetation which may be desirable for erosion control and for other reasons. Also, many of the chemicals are specific in their action and control only a few species, thus leading to increased growth activity on the part of unaffected plants.

It is an object of the present invention to provide a new and improved method for the control of the growth of aquatic plants. Another object is the provision of a method for the treatment of the water environing the submerged portions of aquatic plants in a body of water to control the growth of the plants. A further object is the provision of a method which will control the growth of a large variety of aquatic plants species. An additional object is the provision of novel compositions to be employed in the new method for suppressing the growth of, and killing aquatic plants. Other objects will become apparent from the following specification and claims.

The term "control" in the sense in which it is used in the present specification and claims is intended to set forth, collectively, the actions of killing, inhibiting growth, inhibiting reproduction and proliferation, removing, destroying and otherwise diminishing the occurrence and activity of the controlled species, or the means employed for the achievement of such actions, or the results of such actions. While an eradicant kill and subsequent removal of the unwanted vegetation is considered to be the most desired result, the term "control" is held to be applicable to any of the stated actions, or any combination of them, or the means for their achievement or the results thereof. Specifically, in the present specification and claims, the term "control" is never used in the sense of encouraging, invigorating, beneficiating, protecting, propagating, or increasing.

According to the present invention, it has been found that certain α-halo-tolyl-benzoates corresponding to the formula

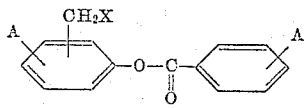

wherein X represents a halogen selected from the group consisting of chlorine, bromine, or iodine, and each A is independently selected from the group consisting of hydrogen, nitro, chlorine and bromine, are very toxic to aquatic plants and that, by selective chemical action, the said chemicals are of very low toxicity to many terrestrial plants.

It has been discovered, further, that when such compounds are contacted in relatively low concentration with aquatic plants of any or all of many species the chemicals act promptly and effectively to kill such plants. It has been discovered, further, that the action to kill aquatic plants is manifest by compositions comprising such compounds together with herbicidal adjuvants. Such adjuvants may be diluents, carriers, excipients, wetting and dispersing agents, surfactants, synergists, and, if desired, cooperating pesticides such as insecticides, fungicides, molluscacides, icthycides, batrachycides, germicides, and the like.

It has been found to be a convenient and preferred method of practicing the present invention as a means of contacting the plant to be killed with the chemical to introduce one or more of the compounds into the water adjacent to the said plant. The chemical in unmodified form may be introduced into the said water, or it may be introduced in the form of a composition wherein are also herbicidal adjuvants, whereby its distribution, dispersion, and contacting of plants is facilitated. The present α-halotolyl-benzoates are crystalline solids soluble in many common organic solvents such as acetone, lower alkyl ethers, lower alkanols, and chlorinated hydrocarbons and of very low solubility in water. The compounds are readily and conveniently adapted to be distributed in water to control aquatic weeds. It is among the advantages of the present invention that the new method accomplishes a quick kill of the stem and leaves of the aquatic plants, accompanied by the control, in a short period of time thereafter of the roots of the rooted species. An advantage of the compounds to be used according to the present invention is their very low toxicity to many terrestrial plants in even heavy applications. A particular advantage of the present invention is the wide range of water temperatures over which the compounds are effective. Thus, the treatment may be carried out at almost any water temperature which will permit the growth and development of aquatic plants, or may be initiated by distributing the compounds over winter ice whereby the desired control begins as the ice melts and the chemical enters the water. A still further advantage of the methods and compositions of the present invention is their ability to control a wide variety of aquatic plant species.

The contacting of the submerged portions of growing aquatic plants with an amount of the α-halo-tolyl-benzoate effective to control the growth of the plant is essential for the practice of the present invention. In general, good results are obtained when the compound is distributed in water adjacent to growing aquatic plants in an amount of from about 0.1 to 100 or more parts per million parts by weight of the environing water. The exact concentration to be employed is dependent upon the plant mass to be treated, and whether the exposure is carried out in a moving stream such as a river or in standing water such as a pond. In standing water, good results are obtained when employing minimum concentrations of the compound. In moving streams, longer periods of contact or somewhat higher concentrations are required in order to provide that the undesired plant growth be contacted with a herbicidal amount of the benzoate compounds. The method of the present invention may be carried out by distributing a growth-inhibiting amount of the benzoate compound or a composition containing the compound in water adjacent to the growing plants to be killed. In such usage, the compound substance may be modified with one or more of a plurality of additaments or herbicide adjuvants including water or inert organic solvents, surface active dispersing agents or finely divided solids, and sticking and adhering agents. Preferred compositions of the present invention comprise emulsifiable liquid concentrates and wettable powder concentrates. Such concentrates are readily and conveniently adapted to be distributed in water adjacent to aquatic plants to provide in the water growth-inhibiting concentrations of the toxicant.

The exact concentration of the benzoate compound to be employed in compositions for the treatment of aquatic plant infested loci is not critical and may vary provided the required concentration of effective agent is supplied in the water adjacent to the plants to be controlled. The concentration of toxicant in liquid compositions employed to supply the desired dosage generally is from 1 to 75 percent by weight of total composition. In finely divided solid compositions, the concentration of toxicant may be from about 1 to about 30 percent by weight. In compositions to be employed as concentrates, the toxicant oftentimes is present in a concentration of from 5 to 95 percent by weight. Liquid compositions containing the desired amount of the present benzoate compound may be prepared by dissolving the toxicant compound in an organic liquid such as a lower alkanol, an alkyl ether, acetone, toluene, methylene chloride, chlorobenzene, and petroleum distillate, or a mixture of two or more such liquids, or by dispersing the toxicant compound in water with the aid of a suitable surface active dispersing agent. The aqueous composition may contain one or more water-immiscible solvents for the present benzoate compounds. In such compositions, the carrier comprises an aqueous emulsion, that is, a mixture of water immiscible solvent, emulsifying agent, and water. The compositions should preferably be characterized by a density only slightly greater than water, and should contain sufficient of the dispersing and emulsifying agent to make the composition self-dispersing in water and thus give an initial dispersion in water which breaks to permit the settling out of a solution of the present benzoate compound.

In the preparation of wettable powder compositions, the benzoate compound is dispersed in and on a finely divided inert solid such as bentonite, fuller's earth, attapulgite and other clays, diatomaceous earth, wood flour, and the like. Such compositions may contain other finely divided solid carriers such as vermiculite fines, talc and chalk. In such operations, the solid carrier may be mixed and mechanically ground with the benzoate compound and surface-active dispersing agents.

The surface-active dispersing agents are generally employed in the amount from about 1 to about 20 percent by weight of the combined weight of the agent and the benzoate compound in the composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps, and the like, such as those sold under the trademarks Tween, Span, Triton, Nacconal, and the like.

The method of the present invention is carried out by contacting the submerged portions of the plants to be killed, with a growth-inhibiting amount of the α-halo-tolyl benzoate compound. This is readily accomplished by introducing the benzoate compound or a composition containing said compound into water above a plant mass so as to permit dispersion in the water adjacent to growing plants. The introduction of the toxicant into the water adjacent to and environing aquatic weeds may be accomplished conveniently by spraying or sprinkling the composition onto or beneath the surface of the water or by metering the composition into the vortex of a rapidly turning propeller, or into the wake behind a moving object such as a boat, to obtain maximum distribution of the compound in the water.

In moving water courses, water flow may be employed to disperse and carry the benzoate compound. Thus, the toxicant may be introduced into the water in such manner that it is distributed into and over the plant growth area for a sufficient exposure time to kill the plant. In general, an exposure of 2 hours or more at the higher concentrations herein contemplated, results in complete control.

The following examples illustrate the invention but are not to be construed as limiting.

*Example 1*

In a representative operation, 0.4 part by weight of α-chloro-o-tolyl benzoate, 10 parts of an acetone solution containing 0.1 percent by weight of a dimeric alkylated aryl polyether alcohol (Triton X–155) and 90 parts of water were mixed together to provide a liquid water-dispersible concentrate. This concentrate was further diluted with water to prepare aqueous compositions containing 100 parts of toxicant per million parts of water. These compositions were employed for the treatment of the water weeds *Cabomba caroliniana, Salvina rotundifolia,* and representative species of the genus Ceratophyllum growing in a series of small tanks. In such operations, the aqueous compositions were poured into the tank to expose the plants to concentrations of 100 parts by weight of the stated benzoate compound per million parts of water. After 2 hours of exposure, the tanks were flushed and refilled with fresh water. Thereafter, the water was changed daily by overflow filling. Other tanks containing the named species were left untreated to serve as checks.

At regular intervals, observations were carried out to ascertain what control of growth had been obtained. Three weeks following the treating operations, the observations showed the control of the growth of all the named plant species was 100 percent; that is to say, all the treated plants had been killed. At the time of observation, the untreated check tanks were found to support luxurious and succulent growth of the named plant species. In a similar test, α-chloro-p-tolyl benzoate gives excellent control of the aquatic weeds.

*Example 2*

In a further operation, 0.4 part by weight of α-iodo-o-tolyl benzoate, 10 parts of an acetone solution containing 0.1 percent by weight of a dimeric alkylated aryl polyether alcohol (Triton X–155) and 90 parts of water were mixed together to provide a liquid water-dispersible concentrate. This concentrate was further diluted with water to prepare aqueous compositions containing 25 parts by weight of toxicant per million parts of water. This composition was employed for the treatment of representative aquatic weeds of the genus Ceratophyllum growing in a small tank. In such operation, the composition was poured into the tank, the plants exposed to the composition for 2 hours. Thereafter, the tank was flushed and refilled with fresh water which was changed daily by over-flow filling.

At regular intervals, observations were carried out to ascertain what control of growth had been obtained. Three weeks following the treating operation, there was found a 100 percent kill of the Ceratophyllum. At the time of observation, the untreated check tanks were found to support luxurious and succulent growth of the Ceratophyllum.

In a similar test, α-iodo-p-tolyl benzoate compositions give excellent control of said water weeds.

*Example 3*

In a further operation, a concenrtate composition prepared in the manner described in Example 2, employing as a sole toxicant α,4-dichloro-p-tolyl benzoate was employed in the manner described in the said example for control of growth of Cabomba caroliniana and Ceratophyllum. In such operations, the Cabomba was exposed for 2 hours to a concentration of 25 parts per million of the toxicant and the Ceratophyllum was exposed for 2 hours to a concentration of 100 parts per million of the toxicant. Three weeks following the treatment, there was found a 98 percent kill of the Cabomba and a 100 percent kill of the Ceratophyllum. At the time of observation, the untreated check tank was found to support luxurious and succulent growth of both species.

*Example 4*

In a further operation, a concentrate composition preprepared in the manner described in Example 2, employing as sole toxicant α-chloro-4-nitro-o-tolyl benzoate. This composition was employed in a quantity to provide 100 parts of toxicant per million parts of water in which the test plants were exposed for 2 hours. The test was applied to representative species of the genera Anacharis and Ceratophyllum and also to Cabomba caroliniana and Lysimastrum nummularia. Three weeks following the treatment, there was found a 95 percent kill of the Anacharis, Lysimastrum, and Ceratophyllum, and 98 percent kill of the Cabomba whereas the untreated check tank was found to support luxurious and succulent growth of all of the species.

*Example 5*

In a further representative operation, a concentrate solution prepared in the manner described in Example 1, containing as sole toxicant α,4-dichloro-o-tolylbenzoate was employed for the control of the growth of species of the genus Ceratophyllum and Cabomba caroliniana. In such operations, the test plants were exposed for 2 hours to a concentration of 100 parts per million of the said benzoate per million parts of environing water. Three weeks after the treatment, there was found a 98 percent kill of the Cabomba and a 100 percent kill of the Ceratophyllum, whereas the untreated check tank was found to support luxurious and succulent growth of the Salvinia.

*Example 6*

50 parts by weight of α-bromo-p-tolylbenzoate and 5 parts by weight of Triton X-155 are mixed and blended together and thoroughly reduced to a powder in a ball mill to prepare a water dispersible concentrate powder.

An emulsifiable concentrate is prepared by mechanically mixing and blending together, 25 parts by weight of α-iodo-4-nitro-o-tolyl-4-nitrobenzoate, 10 parts by weight of Triton X-155, and 65 parts by weight of xylene.

To prepare a concentrate composition in the form of a wettable powder, 25 parts by weight of alpha-iodo-4-bromo-m-tolyl-3-bromo benzoate, 81 parts of fuller's earth, 2 parts of an alkyl aryl sulfonate (Nacconol NR) and 2 parts of a polymerized sodium salt of a substituted benzoid alkyl sulfonic acid (Daxad No. 27) are mechanically mixed and ground together.

Also, 20 parts by weight of α-chloro-3-nitro-o-tolyl-4-chlorobenzoate, 50 parts by weight of acetone, 10 parts of Triton X-155, and 200 parts of water are intimately blended together to prepare a water dispersible liquid concentrate composition. These concentrate compositions or aqueous dispersions thereof in a small quantity of water are adapted to be employed to distribute growth inhibitive amounts of the benzoate compound in water environing aquatic weeds.

The α-chloro compounds employed according to the present invention may be prepared by direct chlorination of the corresponding tolyl benzoates in the presence of a catalytic amount of phosphorous trichloride at a temperature in the range, preferably, of 90° to 120° C., employing approximately 2 atomic equivalents of chlorine with each molecular equivalent of the benzoate compound.

The α-bromo and α-iodo compounds employed according to the present invention may be prepared from the corresponding α-chloro-tolyl benzoate by a metathetical reaction with sodium bromide or iodide in acetone at a temperature of from 40° to 150° C. The crude, that is to say, the unpurified reaction product may be employed with good results according to the method of the present invention. If it is desired to employ a purified compound, such compound may be separated from the reaction mixture in which it was prepared, and purified in manners well known in the art including, for example, removal of solvents by vaporization, and recrystallization from solvent.

The tolyl-benzoate starting materials employed for halogenation to furnish the α-halotolyl benzoates employed herein are prepared in known manners. In one such preparation, a benzoyl chloride which may be a nuclear-substituted benzoyl chloride is added slowly, portionwise, and with stirring to the corresponding meta-, ortho-, or para-cresol or substituted cresol at temperatures in the range of 90° to 150° C. in the presence of, if desired, an inert reaction medium which may be a chlorobenzene. Heating and stirring are continued for a period of time to carry the reaction to completion. If desired, the resulting compound may be separated and purified in known manners, including recrystallization from solvents.

Certain of the compounds whose use is contemplated according to the present invention are the subjects of United States Patents Numbers 3,000,930 and 2,965,673, and application Serial Number 771,973 jointly by Laurence A. Pursglove and Janet N. Paige, filed November 5, 1958, and now abandoned.

Various modifications of the methods and compositions of the present invention may be made without departing from the spirit or scope thereof, and it is to be understood that I limit myself only as defined in the appended claims.

I claim:

1. A method useful for controlling the growth of aquatic plants which includes the step of contacting the submerged portions of the plants with a growth inhibiting amount of a compound corresponding to the formula

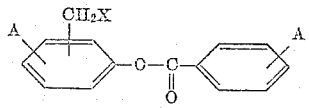

wherein X represents a halogen selected from the group consisting of chlorine, bromine and iodine, and each A is independently selected from the group consisting of nitro, chlorine, bromine, or hydrogen.

2. A method useful for controlling the growth of aquatic plants which includes the step of introducing into water adjacent to the submerged portions of the plants at least 0.1 part by weight of a compound corresponding to the formula

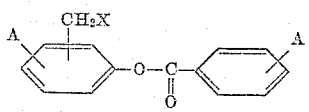

wherein X represents a halogen selected from the group consisting of chlorine, bromine, or iodine and each A is independently selected from the group consisting of bromine, chlorine, nitro, and hydrogen, per million parts of water.

3. A method useful for controlling the growth of aquatic plants which includes the step of introducing into the water adjacent to the submerged portions of the plants a composition comprising at least one compound corresponding to the formula

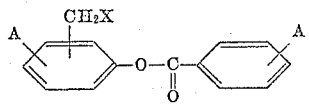

wherein X represents a halogen selected from the group consisting of the chlorine, bromine, or iodine and each A is independently selected from the group consisting of chlorine, bromine, nitro, and hydrogen, as active toxicant in intimate admixture with a herbicide adjuvant, said composition being employed in an amount sufficient to supply at least 0.1 part of the benzoate compound per million parts by weight of the water.

References Cited in the file of this patent

UNITED STATES PATENTS

| | | |
|---|---|---|
| 2,394,916 | Jones | Feb. 12, 1946 |
| 2,841,522 | Wolf | July 1, 1958 |
| 2,905,706 | Sims | Sept. 22, 1959 |
| 2,952,583 | Fritts | Sept. 13, 1960 |
| 2,960,532 | Gordon et al. | Nov. 15, 1960 |
| 2,965,673 | Pursglove | Dec. 20, 1960 |

FOREIGN PATENTS

| | | |
|---|---|---|
| 539,263 | Canada | Apr. 9, 1957 |

OTHER REFERENCES

Nicol, "Manufacturing Chemist and Manufacturing Perfumer," vol. XIX, No. 2, pages 68, 69, February 1948.

Weintraub et al., "Botanical Gazette," pages 348–362 (March 1952).

Thompson et al., "Botanical Gazette," pages 475 to 507, vol. 107, 1946.

Helferich in "Berichte," vol. 83, 1950, pages 569–570.

Oborn in "Weeds," vol. III, July 1954, No. 3, pages 231 to 236.